United States Patent [19]

Salcudean et al.

[11] Patent Number: 5,377,950

[45] Date of Patent: Jan. 3, 1995

[54] PLATFORM MOUNTINGS

[75] Inventors: Septimiu E. Salcudean, Vancouver, Canada; Daniel Ben-Dov, Haifa, Israel

[73] Assignee: The University of British Columbia, Vancouver, Canada

[21] Appl. No.: 943,022

[22] Filed: Sep. 10, 1992

[51] Int. Cl.⁶ .................. F16M 13/00; B25J 17/00
[52] U.S. Cl. ................. 248/581; 248/550; 248/603; 74/18.2; 92/34; 901/28; 901/29; 414/7
[58] Field of Search ............. 248/603, 614, 618, 634, 248/636, 638, 659, 581, 550; 901/27, 28, 29; 414/7; 92/34, 117; 74/18, 18.1, 18.2

[56] References Cited

U.S. PATENT DOCUMENTS

| | | | |
|---|---|---|---|
| 1,845,551 | 2/1932 | Mitzl | 248/638 X |
| 2,937,240 | 5/1960 | Harker | 92/34 X |
| 3,582,027 | 6/1971 | Hackbarth | 248/638 X |
| 3,904,163 | 9/1975 | Kendy et al. | 248/565 |
| 3,933,052 | 1/1976 | Coles | 74/18 X |
| 3,974,744 | 8/1976 | Hedger | 92/34 X |
| 4,402,483 | 9/1983 | Kurabayashi et al. | 248/636 |
| 4,614,084 | 9/1986 | Clot et al. | 901/29 X |
| 4,662,142 | 5/1987 | Weiner | 248/638 X |
| 4,762,455 | 8/1988 | Coughlan et al. | 901/28 X |
| 4,874,998 | 10/1989 | Hollis | 318/568.21 |
| 5,178,024 | 1/1993 | Leclaire et al. | 74/18 |
| 5,228,664 | 7/1993 | Moulinet | 248/634 X |
| 5,251,538 | 10/1993 | Smith | 92/34 |

FOREIGN PATENT DOCUMENTS

| | | | |
|---|---|---|---|
| 394683 | 10/1990 | European Pat. Off. | 74/18 |
| 10139 | 1/1986 | Japan | 248/638 |
| 797530 | 7/1958 | United Kingdom | 248/636 |
| 913925 | 12/1962 | United Kingdom | 248/603 |

Primary Examiner—Rinaldi I. Rada
Assistant Examiner—Clark F. Dexter
Attorney, Agent, or Firm—C. A. Rowley

[57] ABSTRACT

A platform is mounted by bellows, at least one for each degree of freedom (DOF) of the platform. The bellows may provide either an active or a passive mounting for the platform. By arranging a suitable number of such bellows in supporting relationship a platform or floater for example six degrees freedom can be provided. Using pneumatic bellows in opposed pairs, one pair for each degree of freedom and by controlling the pressure in (and flow to) the bellows selected forces may be applied to the platform to accurately position the platform or to provide feedback for a sensory control e.g. as reflected force applied to the joystick. The position and orientation of the platform, i.e. movement of the platform, may be used to generate signals for example as in a joystick. Sensing the pressure in each of the bellows of each of the pairs permits the forces being applied by or to the platform to be monitored.

20 Claims, 5 Drawing Sheets

PLATFORM MOUNTINGS

FIELD OF THE INVENTION

The present invention relates to pneumatic mounting of a platform. More particularly the present invention incorporates bellows to mount the platform to facilitate monitoring or controlling the desired interaction between the platform and its stator.

BACKGROUND OF THE PRESENT INVENTION

The requirements for fast acting interconnecting joints in manufacturing, robotics, teleoperation equipment, etc., with several degrees of freedom (DOF) have been at least partially satisfied using a variety of different methods. In many cases six degrees of freedom must be imparted to an object, however, the performance available with existing systems having this number of degrees of freedom is limited in some ways.

Generally in sensitive systems the operator controls the position or velocity of the slave device by moving the teleoperated master or joystick and the joystick exerts forces on the operators hand that are proportional to those exerted by the slave.

There has been significant work done in developing such devices. However, serial kinematic mechanisms used in conventional robotic technology are inadequate due to their large and varying inertias, friction and backlash. Mechanical devices with parallel actuation such as Stewart platforms (that employ parallel prismatic actuation and that are used for example in aircraft simulators) are some of the more promising fine-motion devices that essentially must trade off workspace for sensitivity of operation. Stewart platforms also have relatively complicated mechanical structure requiring many joints and have varying inertial parameters and usually a rather inhomogeneous force envelope, i.e. the resultant of leg forces is much higher in a particular direction than in others. If direct drive actuators are used in the legs of a Stewart platform, e.g. electric, hydraulic or pneumatic, each imparts different drawbacks and all result in a relatively expensive system.

Some of the most promising fine-motion technology employs electro dynamic or Lorentz magnetic levitation (maglev.). This technology provides six DOF frictionless motion with programmable compliance and has been used as a magnetically levitated robot wrist as well as a teleoperation master in a very highly sophisticated application for nano-telerobotic manipulation systems driving a scanning, tunnelling microscope in order to 'feel atoms'. The device used incorporated a floater actuated by six flat coils operating in strong magnetic fields generated by NdFeB magnets attached to a stator. Controlled movement of the floater relative to the stator, programmable stiffness, as well as commanded forces and torques are achieved through optical sensing and digital feedback control of the coil current. These maglev devices are very suitable for fine-manipulation tasks but are limited to a very small range of motion; by their inability to provide high forces for long periods of time; and by their high cost.

BRIEF DESCRIPTION OF THE PRESENT INVENTION

It is the main object of the present invention to provide a new mounting system for a platform or floater having a preselected number of degrees of freedom and wherein movement of the platform may be regulated and/or the forces applied to or by the floater may be accurately defined or monitored.

It is another object of the invention to provide an actuation system to influence the movement of the platform in selected ways.

Broadly the present invention relates to a mounting system for a platform means comprising at least one bellows means acting on said platform means for each degree of freedom of movement of said platform means, each of said bellows means being expandable, contractible and deformable without permitting rotation about its longitudinal axis so that said bellows means may be expanded and contracted axially and curved in direction deviating from its respective longitudinal axis without rotation about its longitudinal axis.

Preferably each said bellows means will comprise at least one pair of counteracting pneumatic bellows means.

Preferably said platform or floater will have at least three degrees of freedom and will be provided with at least three mutually perpendicular pairs of said pneumatic bellows means.

Preferably said pneumatic bellows means of each pair will be substantially axially aligned when said pair is in a neutral position.

Preferably said platform will have at least four degrees freedom wherein bearing means will be interposed to permit rotation of both said bellows means of at least one of said pairs of pneumatic bellows means about its respective longitudinal axis.

In the most preferred embodiment of the present invention said platform will have six degrees of freedom with six pairs of pneumatic bellows means arranged symmetrically about said platform and wherein three of said pairs of pneumatic bellows means are arranged substantially parallel to a first plane and wherein three others of said pairs are arranged on axes substantially perpendicular to said plane and wherein said others are positioned symmetrically intermediate said first three.

Preferably means will be provided for accurately controlling the pneumatic pressure within each of said pneumatic bellows means.

In yet another preferred embodiment of the present invention means will be provided for sensing the position and orientation of said platform.

Preferably means for controlling the pressure in each of said pneumatic bellows means of at least one of said pairs of pneumatic bellows means will comprise means for sensing pressure in each of the bellows means of said at least one of said pairs of bellows means, means for applying a predetermined air pressure to each of said bellows means of said at least one of said pairs of bellows means and means for selectively bleeding air applied to each pneumatic bellows means of said at least one of said pairs of bellow means at a selected rate to provide the desired difference in pressure in said bellows means of at least one of said pairs of bellows means.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
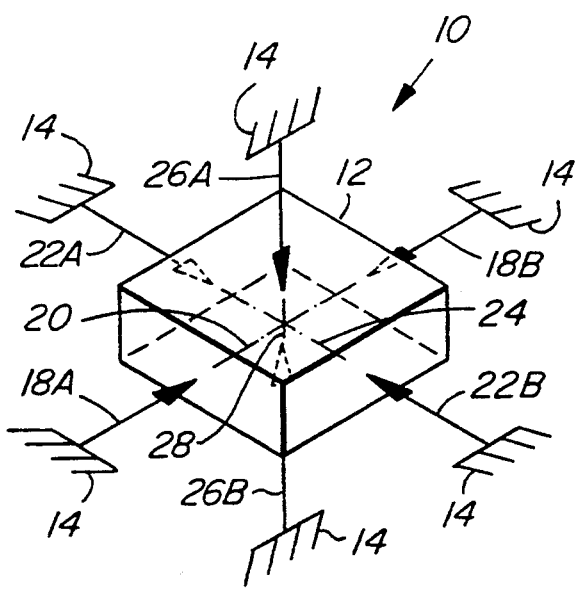
FIG. 1 is a schematic illustration of the platform mounted with three degrees of freedom.

The mounting system 10 of the present invention is formed by a platform or floater 12 supported from a stator 14 by pairs of opposed pneumatic bellows elements 16 or 16A (see FIG. 2 or 2A) which are represented in the various drawings by arrows with the arrows of each pair being designated by the same reference numeral with the subscript A and B thus in FIG. 1 the first pair of opposed bellows 18A and 18B act along a first axis 20, the second pair 22A and 22B act along an axis 24 substantially perpendicular to the axis 20 and the third pair of bellows 26A and 26B act along an axis 28 substantially perpendicular to the other two axes, i.e. the axis 20, 24 and 28 are mutually perpendicular.

Figure 2:
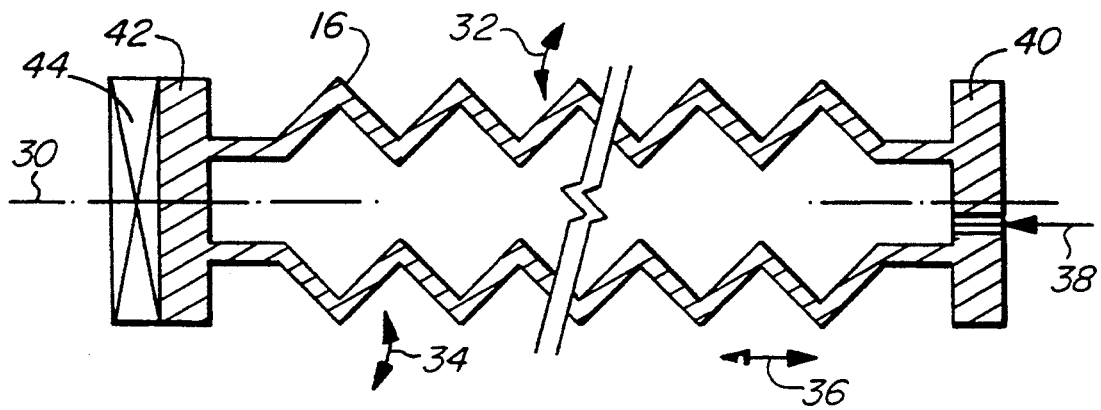
FIG. 2 is a schematic cross section of a bellow that may be used with the present invention.
Figure 2A:
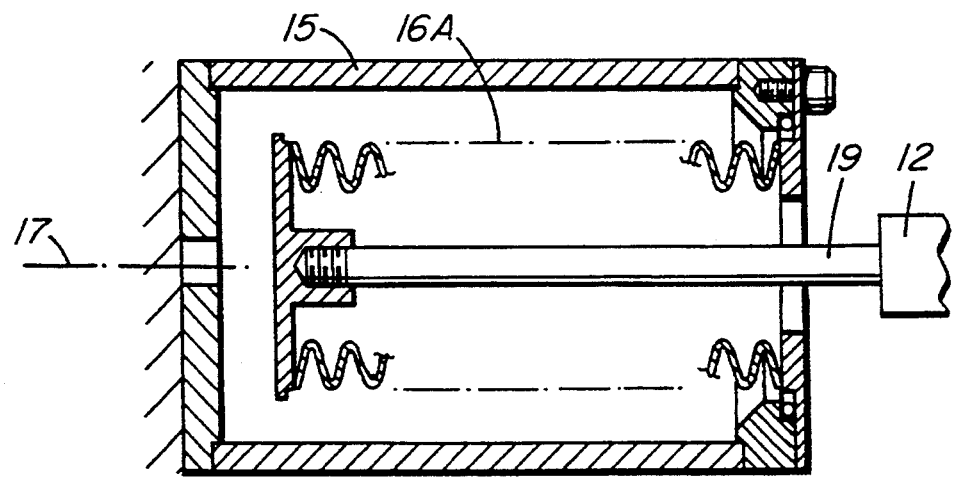
FIG. 2A is a schematic cross section of an inverted bellows.

The bellows 16A shown in FIG. 2A is contained within a sealed chamber 15 into which pressurized air may be applied e.g. via line 17 to adjust (or measure) the forces applied by or to the platform by the bellows 16A. The bellows 16A is connected to one of the platform 12 or stator 14 by the housing or chamber 15 and to the other of the platform 12 or stator 14 via the connecting rod or shaft 19.

Each of the bellows 18A, 18B, 22A, 22B, 26A and 26B will be similar bellows 16 or 16A illustrated in FIGS. 2 and 2A respectively. These bellows are shown as corrugated and thus flexible so that they can be bent relative to their axis 30 in any direction as indicated by the mutually perpendicular arcs 32 and 34, for example to form a simulated s or z shape in substantially any direction and may be expanded and contracted axially as indicated by the arrow 36 by the application of gas, e.g. air under pressure into the interior of the bellow as indicated by the lines 38 and 17.

Internally pressurized bellows 16 is sealed throughout its length and at each axial end as indicated at 40 and 42 so that the pressure within the bellows changes the flexibility of the bellows and also tends to expand or contract it relative to a neutral position. Similarly the pressure outside the externally pressurized bellows 16A of FIG. 2A manipulates the bellows 16A, i.e. the pressure difference between the inside and outside of the bellows 16 or 16A changes the size of the bellows 16 or 16A.

It will be apparent that in a passive bellows system as will be described more fully hereinbelow with respect to FIG. 10 the bellows (400, 402 and 404) need not be sealed since there need be no pressure differential between the inside and outside of these bellows.

The description to follow describing systems incorporating pneumatic bellows (active as opposed to the passive system of FIG. 10) will refer primarily to the internally pressurized bellows 16 to simplify the description, however it is to be understood that this description is to be read as including as an alternative the externally pressurized bellows 16A and that, in some cases, it will be preferred to employ an externally pressurized type of bellows 16A in place of the internally pressurized type of bellows 16 as the externally pressurized type of bellows 16A may not buckle as easily.

Figure 4:
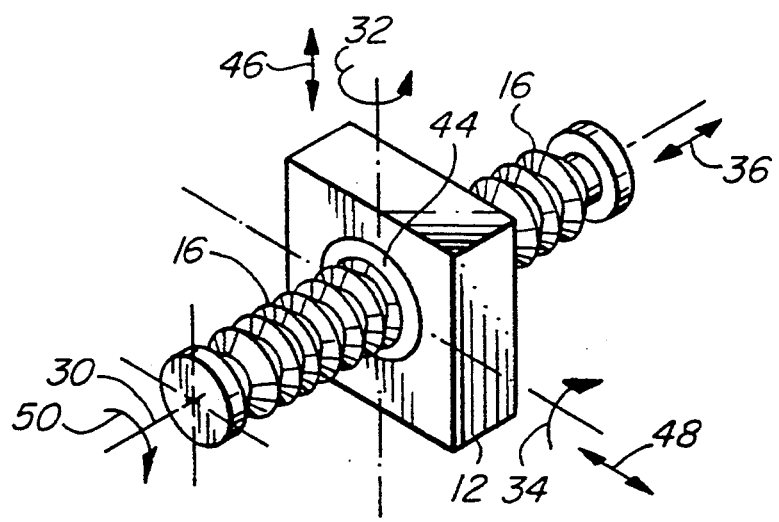
FIG. 4 is a schematic illustration of a pair of bellows illustrating how a bearing may be interposed in the bellows connection to the platform.

In some embodiments it is preferred to provide a bearing such as the bearing 44 as indicated schematically in FIG. 2 and FIG. 4 between the bellows 16 and the platform or floater 12 or between the bellows 16 and the stator 14 or both. It is also possible to provide a bellows with discreet axially extending segments and to interpose bearings between these segments to permit relative rotation of an adjacent pair of segments about the longitudinal axis of the bellows 16. Obviously care must be taken to ensure the desired pressure may be maintained in the segmented bellows.

The illustration of FIG. 4 shows how the bellows 16 may expand and contract as indicated by the arrow 36 and rotate or be deflected as indicated at 32 and 34 to permit movement of the platform 12 in the directions indicated by the arrows 36, 46 and 48. The bellows 16 may also rotate relative to the platform portion 12 substantially around the longitudinal axis 30 of the bellows 16 (i.e. about the axis 30 at its intersection with the platform portion 12) on bearings 44 as indicated by the arrows 50.

Referring back to FIG. 1 and bearing in mind that each of the bellows 16 of the pairs of bellows 18, 22 and 26 are constructed to incorporate the movement described hereinabove. It will be apparent that the platform or floater 12 can be moved to the left, to the right, and up and down or any combination of such directions. It will further be apparent that by controlling the pressure in each of the bellows 16 the bellows can impart the desired movement to the platform 12 adjusting its position and orientation relative to the stator 14. The FIG. 3 arrangement as will be described below also permits or may impart movement around the axis 20 as indicated by the arrows 52.

It will further be apparent that if only one pair of bellows is used, say the pair of bellows 18 (bellows 18A and 18B) then movement of a single degree of freedom is obtainable or if two perpendicular pairs of bellows such as 18 and 22 are used, movement of two degrees of freedom of platform or floater 12 along the axis 20 and 24 is obtainable.

Figure 3:
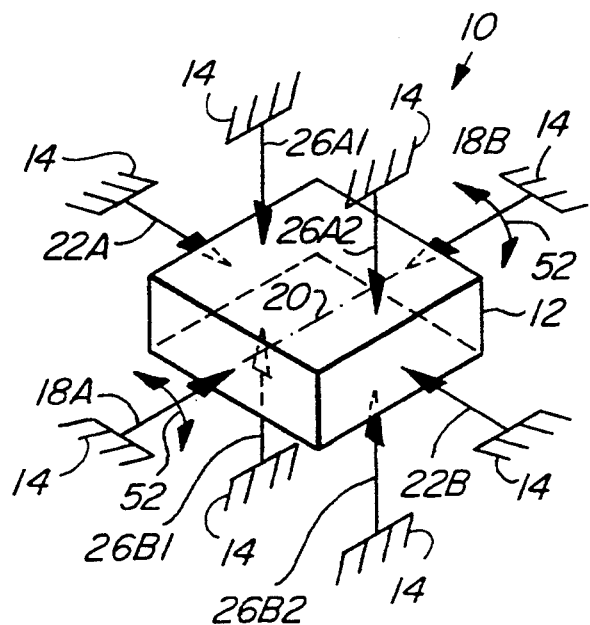
FIG. 3 is a view similar to FIG. 1 but showing a system with four degrees of freedom.

Referring to FIG. 3, like parts have been indicated with like reference numerals, however in this embodiment the bellows 18A and 18B are provided with bearings 44 to permit the platform or floater 12 to rotate around the axis 20 as indicated by arrow 52 (it being apparent that the axis 20 may have a jog in it due to deflection of the bellows 18A and 18B).

To control (or monitor) this rotational movement of the platform 12 around the axis 20 as indicated by the arrow 52 the single pair of bellows 26A and 26B have been replaced by two pairs of bellows which in this case are spaced on either side of the axis 20 and are indicated by the arrows 26A1, 26B1, 26A2, 26B2.

Figure 5:
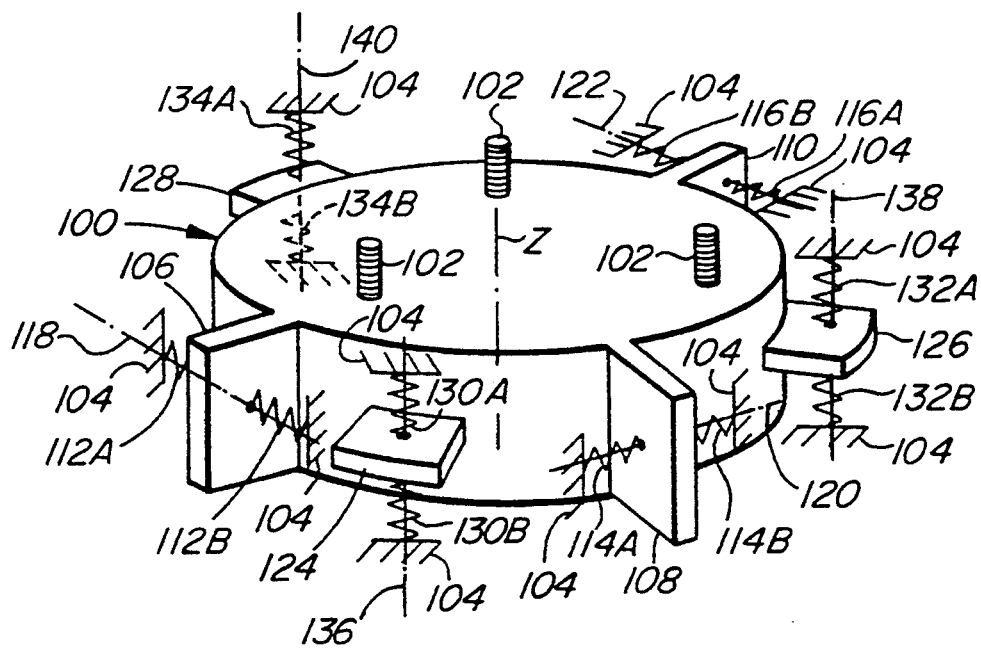
FIG. 5 shows a preferred form of the present invention applied to a mounting platform, for example, to form a wrist of a robot.

FIG. 5 shows a preferred arrangement of the present invention offering six degrees of freedom for the platform or floater 100 which may take the form of a wrist joint or the like of a robot and to which other components may be fixed for example via the bolts 102. The stator 104 provides the other side of the wrist joint.

In this arrangement the floater or platform 100 is mounted on the stator 104 by the pneumatic bellows acting on a first set of lugs 106, 108 and 110 and a second set of lugs 124, 126 and 128. The first set of lugs 106, 108 and 110 are symmetrically positioned around the z axis i.e. spaced at 120 degree intervals around the z axis and the second set of lugs 124, 126 and 128 are symmetrically positioned between the lugs 106, 108 and 110 i.e. also at 120 degree intervals around the z axis and each equally spaced from its respective adjacent lugs of the first set of lugs.

The lugs 106, 108, and 110 are acted upon by opposed pairs of bellows 112A, 112B, 114A, 114B, and 116A and 116B respectively to apply forces along axes 118, 120 and 122 respectively all of which are substantially perpendicular to, i.e. they are in a plane substantially perpendicular to, the Z axis.

The lugs 124, 126 and 128 are acted on by pairs of opposed bellows 130A and 130B, 132A and 132B and 134A and 134B respectively to apply forces along axis 136, 138 and 140 all of which are substantially parallel to the z axis.

Each of the bellows of the pairs of bellows 112, 114, 116 and 130, 132 and 134 are provided with bearings equivalent to the bearings 44 so that rotation around each of the axes 118, 120, 122, 136, 138 and 140 can also be obtained. This arrangement permits movement of the base 100 with 6 degrees of freedom, i.e. movement in the x, y, z axes and in the pitch and yaw directions can be accommodated through the bellows mountings. This action or motion can be controlled by controlling the pressure in each of the pneumatic bellows in each of the pairs of bellows as will be described hereinbelow.

Figure 6:
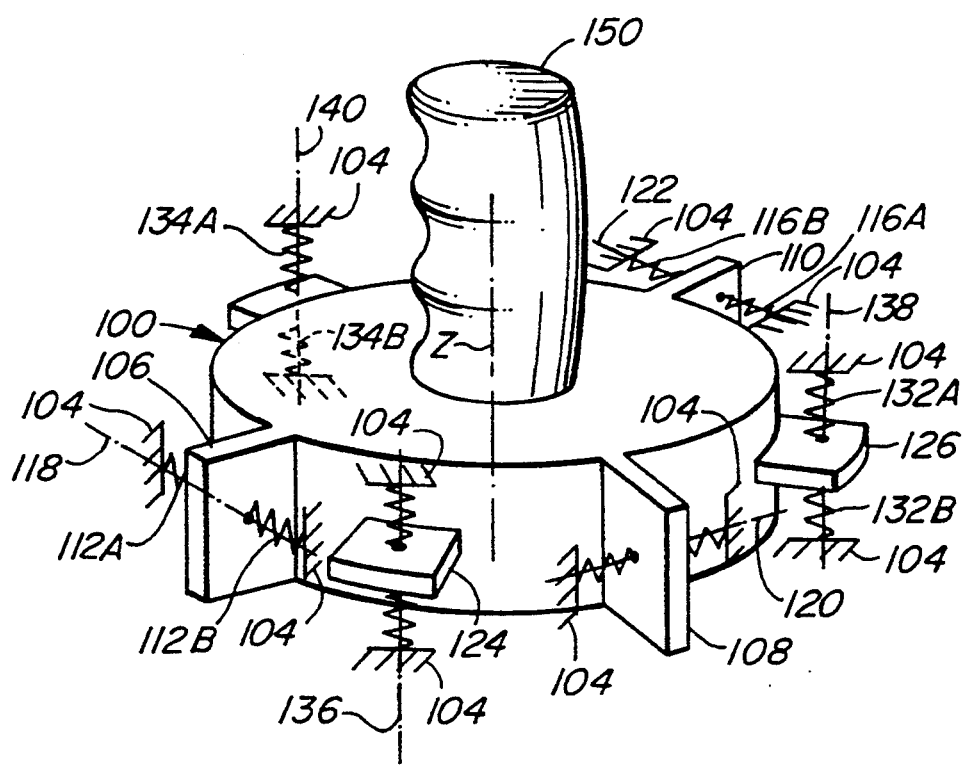
FIG. 6 is a schematic illustration similar to FIG. 5 but illustrating the platform or floater designed as a hand controller or joystick.

The embodiment shown in FIG. 6 is essentially the same as that shown in FIG. 5, however instead of the bolts 102 there is provided a hand grip 150. The corresponding elements have been indicated by like reference numerals in FIGS. 5 and 6.

It will be apparent with the FIG. 6 embodiment, movement of the joystick or hand controller 150 has the same six degrees of freedom as in the FIG. 5 embodiment and may be used as a control by sensing the position of the hand controller and as another example to provide force feedback by controlling pressures in the opposing pairs of bellows.

Figure 7:
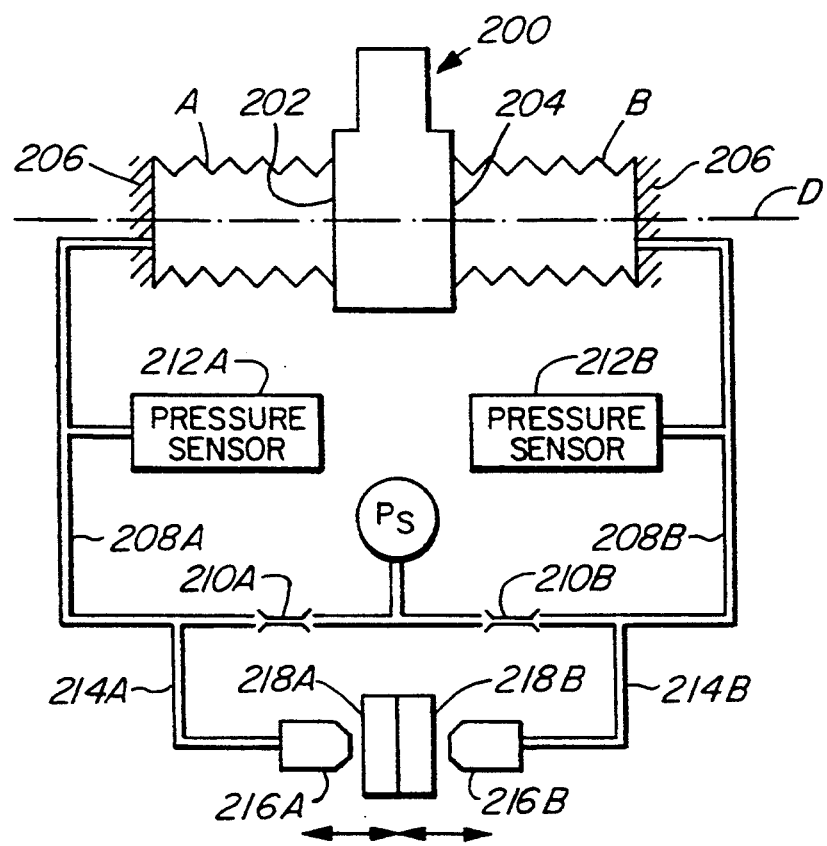
FIG. 7 is an illustration of a pneumatic control system that may be used with the present invention.

FIG. 7 shows one system for monitoring and controlling the pressure (and flow) in each bellows of a pair of opposed bellows. The bellows A and B apply pressure along the axis D against opposite sides of the plate or platform 200 which is used to represent the opposed sides of the platform 12 of the FIGS. 1 and 2 embodiments or the various flanges or lugs 106, 108, 110 and 124, 126 and 128 of the FIGS. 5 and 6 embodiments.

As shown in FIG. 7 bellows A and B provide or apply pressure between the stator or fixed element 206 and the opposed faces 202 and 204 respectively of the platform 200. The bellows A and B are both supplied with pneumatic pressure from the pressure source Ps via essentially the same circuit elements of which have been numbered with the same number followed by the A for bellows A and the B for bellows B. As indicated, pressure from the source Ps passes via line 208 through a fixed orifice 210 into the bellows A or B. The pressure in the line 208 between the fixed orifice 210 and the respective bellows A (or B) is sensed by the pressure sensor 212. A branch or bleed line 214 extends from the section of line 208 between the bellows A (or B) and the orifice 210 to an orifice 216 the outflow from which is controlled by a moving coil actuator 218 that is controllably oscillated or positioned relative to its respective nozzle 216 to define the pressure in the line 208 (A or B respectively). In a pneumatic control system of the type described it will be apparent that other pressure control systems may be used, for example a Jet Pipe valve could easily be applied.

It will be apparent that with this system the pressure in the bellows A and B may be set as desired depending on the bleed through the nozzles 216A or 216B respectively which is in turn controlled by the moving coil actuator 218A or 218B.

It will be apparent that other means for controlling the pressures in the bellows A and B may be used.

Figure 8:
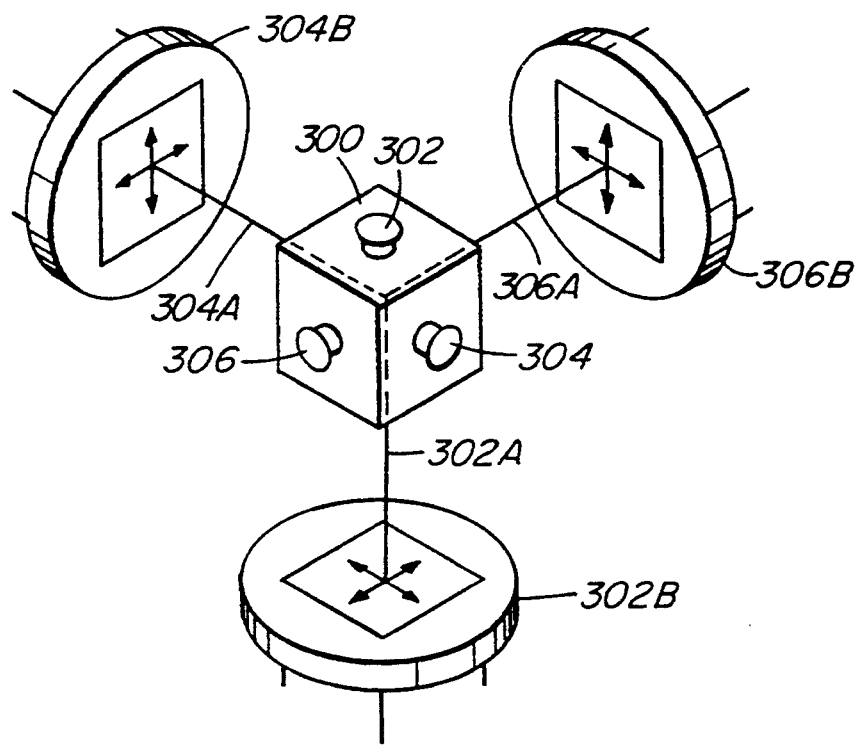
FIG. 8 shows one type of sensing system that may be used to determine the position and orientation of the platform.

A variety of different techniques for sensing the position of the platform 12, 100 or 200 may be used however a preferred system is shown in FIG. 8. In this arrangement a light source 300 is fixed to the platform or floater 12, 100 or 200. In the illustrated arrangement, 3 light emitting diodes 302, 304 and 306 are provided each directing a beam of light along its respective axis 302A, 304A and 306A onto its respective positioning sensor 302B, 304B, 306B which may take the form of position sensing photo diodes or close coupled devices (CCD arrays) that are attached to the stator 14, 104 or 206 and are adapted to sense the location at which the beam projected along the axis 302A, 304A and 306A intersect the photo diodes so that position of the floater or platform 12, 100 or 200 can be determined via the cartesian coordinates of the point of contact of the light beams 302A, 304A and 306A with their respective position sensing photo diodes. The simplest manner in which this may be done is to project the beams 302A, 306A as orthogonal beams of light engaging two dimensional position sensing diodes and utilizing simple kinematic calculations (intersection of 3 spheres) to generate the position and orientation of the platform or floater 12, 100 or 200 with respect to the stator 14, 104 or 206.

Figure 9:
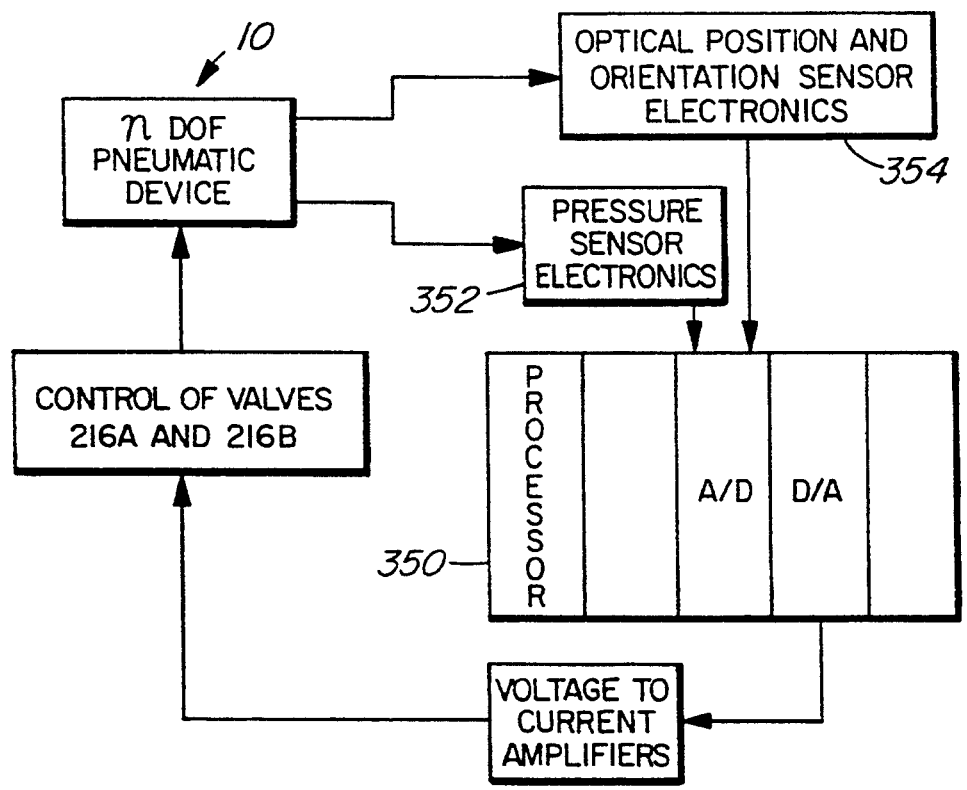
FIG. 9 is a schematic illustration of an electronic control system suitable for use with the present invention.

One technique for operating the system illustrated in FIG. 9 incorporates a processor 350 that receives input from the pressure sensing electronics 352 (which senses the pressure from the pressure sensors 212A and 212B for each of the pairs of bellows used in the system, i.e. depending on the number of degrees of freedom to provide feedback of the actual pressures in each of the bellows A and B of each of the pairs bellows used in the particular mounting system being controlled, i.e. for the six degrees of freedom device shown in FIGS. 5 and 6 the various pairs of bellows 112, 114, 116, 130, 132 and 134 A and B would be sensed and this information delivered to the processor or computer 350).

It will be apparent that by controlling the pressure in the respective bellows force control may be achieved. It is possible to, for example, sense the pressures applied to an arm being controlled and to develop corresponding pressures resisting movement of a control joystick in these respective directions to provide a feed back to the joystick of the pressures or forces being encountered by the arm being controlled.

If an optical sensor such as the optical sensor 300 (302A, 304A, 306A, 302B, 304B, 306B) shown in FIG. 8 were also incorporated in the device, then the output or the optical sensed position and orientation would be determined as indicated at 354 and this information fed to the computer 350. The processor 350 could also be programmed to obtain a selected movement of the floater 12, 100 or 200 (assuming the floater movement is intended to be controlled and manipulated as a wrist of a robot for example).

Figure 10:
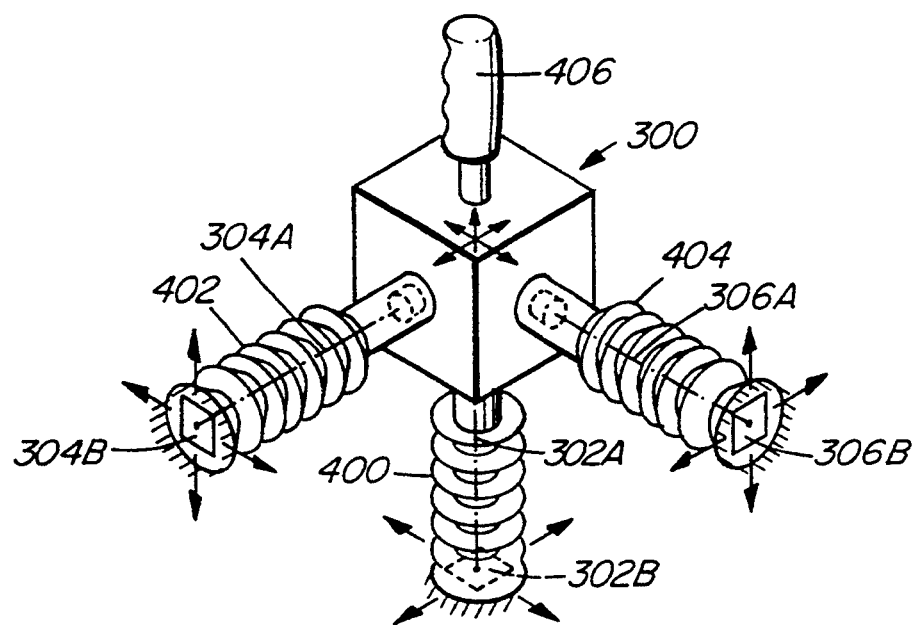
FIG. 10 shows a passive joystick mounting wherein the structure of the bellows provides the restraining forces and wherein the position of the platform is monitored through the bellows.

Referring now to FIG. 10 it will be apparent that the position sensing system employed in this arrangement is essentially the same as that shown in FIG. 8, however in this system the light beams 302A, 304A and 306A extend substantially axially of their respective bellow 400, 402, 404 onto their respective detectors 302B, 304B and 306B.

The system shown in FIG. 10 is a passive system wherein the construction of the bellows generates forces or stresses when the joystick and bellows are moved from their natural rest positions neutral and these stresses are absorbed by the bellows structure and function to urge the joystick and bellows back to their neutral positions whenever they have been moved therefrom and then released.

The passive mounting system of FIG. 10 differs from the above described active systems in the construction of each of the bellows 400, 402 and 404 which is such that when the joystick 406 is in neutral position all of the bellows are also in a stable or neutral position. Movement of the joystick 406 in the 3 degrees of freedom provided by the three bellows 400, 402 and 404 (one for each degree of freedom) causes expansion and/or contraction of each of the bellows and/or deflection relative to its longitudinal axis (as represented by the beams 302A, 304A and 306A respectively as described above. Pneumatic pressure is not required nor is it necessary to employ pairs or opposing bellows as described hereinabove since each of the bellows 400, 402, 404 has a stable position from which it may be either extended or contracted or bowed, but to which it always tends to return. The bellows 400, 402, 404 are constructed to prevent rotation about their respective longitudinal axis 302A, 304A and 306A so movement of the joystick is confined to the x, y and z directions (or combinations thereof) without pivoting motion of the joystick.

Having described the invention, modifications will be evident to those skilled in the art without departing from the spirit of the invention as defined in the appended claims.

We claim:

1. A mounting system for mounting a platform to a stator comprising at least one counteracting pair of bellows means connected to and acting between said stator and said platform for each degree of freedom of movement of said platform, each of said bellows means of said counteracting pair being arranged on opposite sides of at least portions of said platform and including a bellows that is expandable, contractible and deformable, said bellows means further including a rotatable connection to at least one of said platform and said stator such that rotation of a first end of said bellows relative to a second end of said bellows about a longitudinal axis of said bellows is prevented so that said bellows means may be expanded and contracted axially and curved in a direction deviating from its respective longitudinal axis without said relative rotation of said first end and second ends about its longitudinal axis, said bellows means further including a sealed chamber containing said bellows and a shaft extending from said first end of said bellows which is a sealed end contained within said sealed chamber, through said bellows and out of the second end of said bellows remote from said sealed end, one of said chamber and said shaft being connected to said platform in force transmitting relationship and the other of said shaft and said chamber being connected to said stator in force transmitting relationship.

2. The mounting system as defined in claim 1 wherein said bellows means of each said counteracting pair are axially aligned when said platform is in a neutral position.

3. The mounting system as defined in claim 2 further comprising means for controlling pneumatic pressure within said sealed chamber of each of said bellows means.

4. The mounting system as defined in claim 3 wherein said means for controlling the pressure in each of said bellows means of said at least one counteracting pair of bellows means comprises means for sensing pressure in each of said bellows means, means for applying a predetermined air pressure to each of said bellows means and means for selectively bleeding air applied to each of said bellow means at a selected rate to provide a desired difference in pressure in said bellows means of said at least one counteracting pair of bellows means.

5. The mounting system as defined in claim 1 wherein said platform has at least 4 degrees of freedom and wherein said rotatable connection is provided by bearing means to permit rotation of each of said bellows means about its longitudinal axis relative to one of said platform and said stator.

6. The mounting system as defined in claim 5 wherein said platform has six degrees of freedom and wherein six pairs of bellows means are arranged about said platform and wherein a first three of said counteracting pairs of bellows means are arranged substantially parallel to a first plane and wherein three others of said counteracting pairs are arranged on axes substantially perpendicular to said plane and wherein said each of said three others is positioned intermediate different adjacent counteracting pairs of said first three counteracting pairs.

7. The mounting system as defined in claim 6 further comprising means for controlling pneumatic pressure within said sealed chamber of each of said bellows means.

8. The mounting system as defined in claim 7 wherein said means for controlling the pressure in each of said bellows means of said at least one counteracting pair of bellows means comprises means for sensing pressure in each of said bellows means, means for applying a predetermined air pressure to each of said bellows means and means for selectively bleeding air applied to each of said bellows means at a selected rate to provide a desired difference in pressure in said bellows means of said at least one counteracting pair of bellows means.

9. The mounting system as defined in claim 8 further comprising means for sensing the position and orientation of said platform.

10. The mounting system as defined in claim 7 further comprising means for sensing the position and orientation of said platform.

11. The mounting system as defined in claim 5 further comprising means for controlling pneumatic pressure within said sealed chamber of each of said bellows means.

12. The mounting system as defined in claim 11 wherein said means for controlling the pressure in each of said bellows means of said at least one counteracting pair of bellows means comprises means for sensing pressure in each of said bellows means, means for applying a predetermined air pressure to each of said bellows means and means for selectively bleeding air applied to each of said bellows means at a selected rate to provide a desired difference in pressure in said bellows means of said at least one counteracting pair of bellows means.

13. The mounting system as defined in claim 11 further comprising means for sensing the position and orientation of said platform.

14. The mounting system as defined in claim 11 wherein said means for controlling pressure within each of said sealed chambers comprises means for sensing pressure in each of said sealed chambers, means for sensing the position and orientation of said platform, and processor means for controlling the pressure in each of said sealed chambers.

15. The mounting system as defined in claim 5 further comprising means for sensing the position and orientation of said platform.

16. The mounting system as defined in claim 1 further comprising means for controlling pneumatic pressure within said sealed chamber of each of said bellows means.

17. The mounting system as defined in claim 16 wherein said means for controlling the pressure in each of said bellows means of said at least one counteracting pair of bellows means comprises means for sensing pressure in each of said bellows means, means for applying a predetermined air pressure to each of said bellows means and means for selectively bleeding air applied to each of said bellows means at a selected rate to provide a desired difference in pressure in said bellows means of said at least one counteracting pair of bellows means.

18. The mounting system as defined in claim 17 further comprising means for sensing the position and orientation of said platform.

19. The mounting system as defined in claim 16 wherein said means for controlling pressure within each of said sealed chambers comprises means for sensing pressure in each of said sealed chambers, means for sensing the position and orientation of said platform, and processor means for controlling the pressure in each of said sealed chambers.

20. The mounting system as defined in claim 1 further comprising means for sensing the position and orientation of said platform.

* * * * *